(12) United States Patent
Van Delden et al.

(10) Patent No.: US 11,940,191 B2
(45) Date of Patent: Mar. 26, 2024

(54) EXPANSION VALVE

(71) Applicant: Mahle International GmbH, Stuttgart (DE)

(72) Inventors: Jeffrey Van Delden, Stuttgart (DE); Matthias Lindenberg, Stuttgart (DE); Florian Wetzel, Baltmannsweiler (DE)

(73) Assignee: MAHLE INTERNATIONAL GMBH (DE)

( * ) Notice: Subject to any disclaimer, the term of this patent is extended or adjusted under 35 U.S.C. 154(b) by 0 days.

(21) Appl. No.: 17/541,231

(22) Filed: Dec. 2, 2021

(65) Prior Publication Data
US 2022/0178599 A1 Jun. 9, 2022

(30) Foreign Application Priority Data
Dec. 3, 2020 (DE) ...................... 10 2020 215 268.3

(51) Int. Cl.
*F25B 41/35* (2021.01)
*F16K 31/04* (2006.01)
(Continued)

(52) U.S. Cl.
CPC .............. *F25B 41/35* (2021.01); *F16K 31/04* (2013.01); *F16K 31/08* (2013.01); *F16K 31/50* (2013.01); *F25B 41/345* (2021.01)

(58) Field of Classification Search
CPC .................................. F25B 41/35; F16K 31/50
See application file for complete search history.

(56) References Cited

U.S. PATENT DOCUMENTS

| 4,859,153 A * | 8/1989 | Mayer | ..................... F04F 13/00 417/64 |
| 5,690,828 A * | 11/1997 | Clay | ....................... G21F 5/015 210/744 |

(Continued)

FOREIGN PATENT DOCUMENTS

| CN | 202852147 U | 4/2013 |
| DE | 3411285 A1 * | 10/1985 |

(Continued)

OTHER PUBLICATIONS

Thanh Son, Reusable, frictionally-locked threaded bolt securing device of a screw connection having a threaded bolt and nut, Oct. 3, 1985, DE3411285A1, Machine Translation (Year: 1985).*

(Continued)

*Primary Examiner* — Nael N Babaa
(74) *Attorney, Agent, or Firm* — Fishman Stewart PLLC

(57) ABSTRACT

An expansion valve includes a housing, a threaded bush, a valve body, and a permanent magnet body. The threaded bush is arranged in the housing and extends along an axial direction. The threaded bush includes an external thread. The valve body is partially adjustably received in the threaded bush along the axial direction. The permanent magnet body is of a pot-shaped design and arranged in the housing. The permanent magnet body extends the threaded bush along the axial direction such that the valve body is partially received in a valve body receptacle surrounded by the permanent magnet body. The permanent magnet body surrounds a radially outside of the threaded bush in a common transition portion. In the transition portion, the permanent magnet body is firmly connected to the threaded bush via a latching connection.

20 Claims, 3 Drawing Sheets

(51) Int. Cl.
    *F16K 31/08*     (2006.01)
    *F16K 31/50*     (2006.01)
    *F25B 41/345*    (2021.01)

(56)         References Cited

U.S. PATENT DOCUMENTS 6,220,571  B1 *   4/2001   Kim ................. F16K 31/047
                                                            251/903
 2016/0160903  A1 *   6/2016   Veilleux, Jr ......... F16B 39/282
                                                            411/221
 2019/0323562  A1 *  10/2019   Schmidt ................ F16C 3/02
 2019/0368618  A1 *  12/2019   Wei ..................... F16K 1/52
 2020/0191095  A1 *   6/2020   King .................. F16K 31/44

FOREIGN PATENT DOCUMENTS

EP          1331426  A2    7/2003
    EP          2589786  A1    5/2013
    EP         2 650 575 A1   10/2013
    EP          3392538  A1   10/2018
    JP        2015-105714 A    6/2015
    WO        2015062422  A1    5/2015
    WO        2016092035  A1    6/2016
    WO        2020199900  A1   10/2020

OTHER PUBLICATIONS

English abstract for JP- 2015-105714.
German Search Report for DE- 10 2020 215 268.3.
Chinese Search Report dated Sep. 20, 2023, CN202111457241.5 (w_translation).
Chinese Office Action dated Sep. 27, 2023, CN202111457241.5 (w_translation).

* cited by examiner

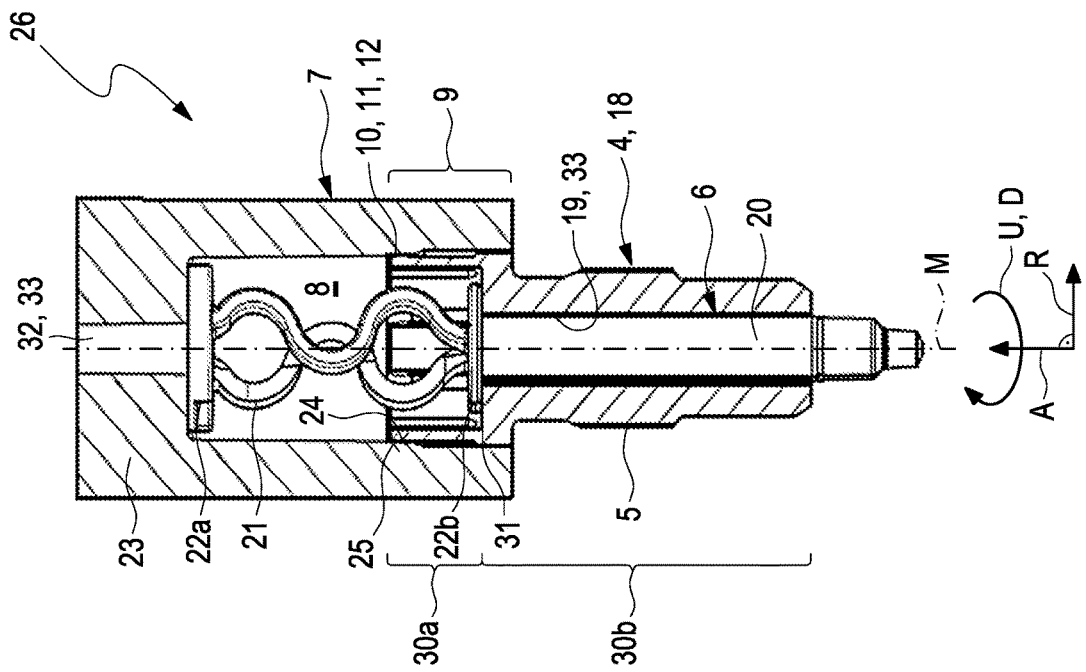
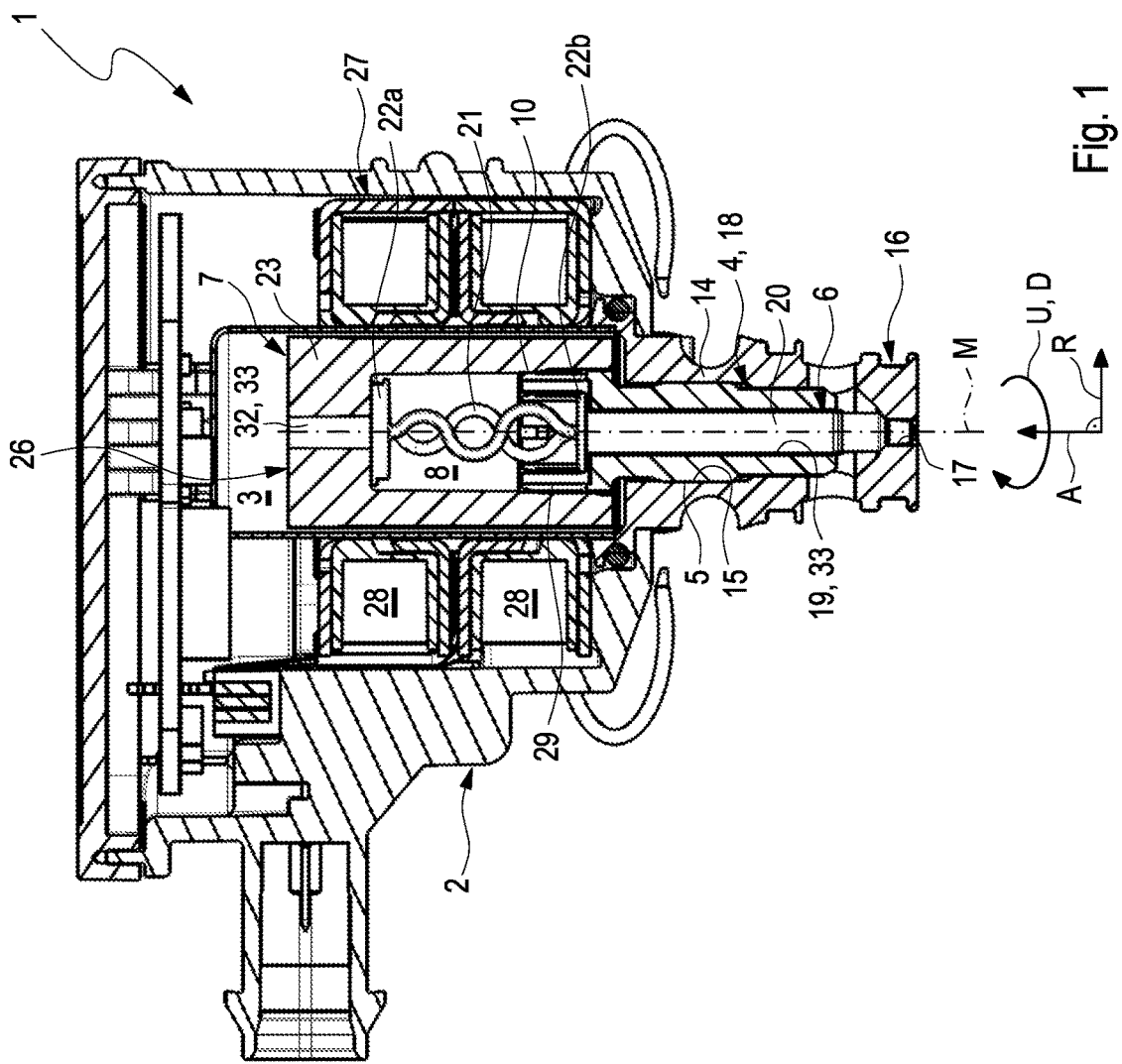

EXPANSION VALVE

CROSS-REFERENCE TO RELATED APPLICATIONS

This application claims priority to German Patent Application No. DE 10 2020 215 268.3, filed on Dec. 3, 2020, the contents of which is hereby incorporated by reference in its entirety.

TECHNICAL FIELD

The present invention relates to an expansion valve for an air-conditioning system of a motor vehicle.

BACKGROUND

Expansion valves are valves which, by way of a local constriction of a flow cross section, reduce the pressure of a fluid flowing through downstream of the constriction and thereby bring about an increase in volume or expansion. In air-conditioning systems, in particular in motor vehicles, such an expansion valve reduces the pressure of a refrigerant. So-called electrical expansion valves often include a stator and a rotor, which, by way of electrical energisation of the stator, can be driven and thus rotated. The rotatable rotor in turn is drive-connected in the manner of a helical gearing to a valve body of the expansion valve which can thus be adjusted—preferably linearly—between an open position and a closed position. By adjusting into an open or closed position or an intermediate position between open and closed position, the flow-cross section mentioned at the outset can be varied and thus the desired pressure reduction also adjusted.

However it process to be disadvantageous that because of the multi-part nature of the expansion valves known from the prior art high demands are made on the—in particular axial—tolerances of the individual components when it is to be ensured that the expansion valve assembled from these individual components operates with the desired accuracy and reliability.

SUMMARY

The present invention therefore deals with the problem of showing new ways in the development of expansion valves. In particular, an improved expansion valve is to be created, which addresses the problems mentioned above.

According to the invention, this problem is solved through the subject matter of the independent patent claim(s). Advantageous embodiments are the subject matter of the dependent patent claim(s).

Accordingly, the basic idea is to form the rotor of the expansion valve in three parts having a valve body for closing a valve opening, having a threaded bush for receiving and axially guiding the valve body and having a permanent magnet body, which can be driven by means of an electric stator. Here it is substantial for the invention that the threaded bush is firmly connected to the permanent magnet body by means of a latching connection. This means that the threaded bush and the permanent magnet body are coupled to one another during both rotary movements and also during axial movements. Although threaded bush and permanent magnet body, which can advantageously consist of different materials, are basically formed in two parts, they act, by means of the solution introduced here, mechanically as a single component during the movement of the rotor.

In an advantageous manner, the latching connection, which is substantial for the invention, between threaded bush and permanent magnet body additionally makes possible, when assembling permanent magnet body, threaded bush and valve body to form the rotor of the expansion valve, to precisely position these three components relative to one another in particular along the axial direction and thereby maintain a particularly small axial-length tolerance compared with conventional expansion valves.

A further advantage of the solution according to the invention consists in that the assembly of the rotor proves to be particularly simple since, substantially, merely the valve body has to be arranged in a valve body receptacle of the threaded bush and subsequently the threaded bush, with the valve body received therein, inserted into the permanent magnet body of pot-shaped design and there latched to the same.

The result is an expansion valve that is simple to assemble yet meets very low tolerances.

An expansion valve according to the invention for an air-conditioning system of a motor vehicle includes a housing delimiting a housing interior. Further, the expansion valve includes a threaded bush extending along an axial direction and comprising an external thread, which threaded bush is arranged in the housing interior and in which a valve body of the expansion valve is received so as to be axially adjustable. Furthermore, the expansion valve includes a permanent magnet body of pot-shaped design. The permanent magnet body is arranged in the housing interior and firmly connected to the threaded bush. The permanent magnet body extends the threaded bush along the axial direction so that the valve body is not only received in the threaded bush, but partially also in a valve body receptacle surrounded by the permanent magnet body of pot-shaped design. In a common transition portion of permanent magnet body and threaded bush, the threaded bush surrounds the permanent magnet body radially outside and this transition portion is firmly connected to the threaded bush at least by means of a latching connection. Here, an outer circumference side of the threaded bush in the transition portion can lie against an inner circumference side of the permanent magnet body. The firm connection realised by means of the latching connection between threated bush and permanent magnet body is realised in particular non-rotatably, which is particularly significant since the threaded bush and the permanent magnet body as part of the rotor are to jointly perform rotary movements during the operation of the expansion valve.

Practically, the latching connection includes at least one preferably spring-elastic latching hook formed on the threaded bush, which lies against the permanent magnet body and exerts a preload force against the permanent magnet body. Through the preload force exerted by the latching hook on the material of the permanent magnet body an indentation or recess is created in the typically relatively soft magnetic or magnetisable material during the course of the assembly of the threaded bush on the permanent magnet body, which for creating the latching connection forms the respective counterpart for the engagement hook. In this way, the desired latching of the at least one latching hook with the permanent magnet body is realised.

Practically, the latching connection that is substantial for the invention includes not only a latching hook, but two or more such latching hooks. Preferably, these latching hooks can be arranged along the circumferential direction of the threaded bush spaced apart from one another on the threaded bush, in particular on the outer circumference side of the same. Particularly practically, the said latching hooks are integrally moulded out of the threaded bush.

According to a preferred embodiment, the at least one latching hook is arranged on an axial longitudinal end of the threaded bush axially facing the permanent magnet body. Alternatively or additionally, the at least one latching hook can extend along the axial direction. In this way, both a particularly good non-rotatable coupling and also a very good axial coupling of the threaded bush to the permanent magnet body can be achieved by means of the latching hook. Thus, both undesirable relative rotary movements as well as axial movements of threaded bush and permanent magnet body relative to one another are avoided.

Particularly preferably, a positive-locking connection between the threaded bush and the permanent magnet body is formed in the transition portion by means of the latching connection, in particular by means of the at least one latching hook. Such a positive-locking connection allows a particularly good coupling of permanent magnet body and threaded bush both along the rotary direction, i.e. circumferential direction, and also along the axial direction.

According to a preferred embodiment, the at least one latching hook, for forming the positive connection of the threaded bush with the permanent magnet body, is at least partially received in an indentation or recess formed on the permanent magnet body. In this way, a particularly good positive connection between the threaded bush and the permanent magnet body can be realised.

Particularly preferably, the permanent magnet body, for forming the firm connection between threaded bush and permanent magnet body, is additionally firmly connected to the threaded bush by means of a non-positive connection in the transition portion. In this way, in particular during a rotary movement of the rotor regularly occurring during the operation of the expansion valve—and thus also of threaded bush and permanent magnet body—the desired non-rotatable coupling of the threaded bush to the permanent magnet body is reinforced.

Particularly preferably, the latching connection is formed so that the same also produces the frictional connection between the threaded bush and the permanent magnet body. Here it is opportune to realise a preferably flat contact of the at least one latching hook with the material of the permanent magnet body.

According to a further advantageous development, a knurling is formed on the threaded bush in the transition portion. In this way, a frictionally locking connection is formed in the transition portion—regardless of the latching connection provided there—as a result of which in turn the non-rotatable coupling of the threaded bush to the permanent magnet body is improved.

Particularly practically, since technically simple and thus cost-effectively realisable, the threaded bush is formed as a hollow shaft with a through-opening extending axially, in which the valve body is received. In this version, the expansion valve includes a valve seat that is firmly connected to the housing, which surrounds a valve opening in which the threaded bush with the valve body is adjustably arranged. Here, an internal thread formed complementarily to the external thread of the threaded bush is provided on a bush guide present on the valve seat. The internal thread interacts with the external thread in such a manner that a rotary movement of the threaded bush along a rotary direction perpendicularly to the axial direction brings about an adjustment of the valve body along the axial direction relative to the valve seat or relative to the bush guide in the manner of helical gearing.

Particularly preferably, the through-opening can be formed with a radial step which subdivides the through-opening into a first axial longitudinal portion facing the permanent magnet body and a second axial longitudinal portion facing away from the permanent magnet body. In this case, the valve needle can be received in the second axial longitudinal section, the spring-elastic element by contrast in the first axial longitudinal portion.

According to an advantageous further development, the valve body comprises a valve needle for closing the through-opening in a fluid-type manner and a spring-elastic element for axially preloading the valve needle. By means of such a spring-elastic element an overpressure protection can be realised.

According to an advantageous further development, the valve body axially supports itself on the permanent magnet body by means of a first support element, in particular on a pot bottom of the permanent magnet body and on the threaded bush by means of a second support element. Preferably, the spring-elastic element can be axially arranged between the two support elements. By means of such an arrangement, a preload force can be generated by the spring-elastic element in a simple manner and, in this way, a pressure relief valve realised. When the fluid pressure of the fluid exceeds a predetermined threshold value, the valve needle can be moved away from the valve seat, against the preload force exerted by the spring-elastic element, away from the closed position or the valve opening so that fluid can flow through the valve opening.

Particularly preferably, the two support elements, the spring-elastic element and the valve needle are formed integrally in this version. This version proves to be particularly cost-effective.

Practically, the permanent magnet body is formed by a magnetic or magnetisable material, in particular ferrite or a rare-earth metal.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically,

FIG. 1 shows a representation of a section through an expansion valve according to the invention, FIG. 2 shows a detail sectional representation of the FIG. 1 in the region of the rotor.

DETAILED DESCRIPTION

Figure 3:
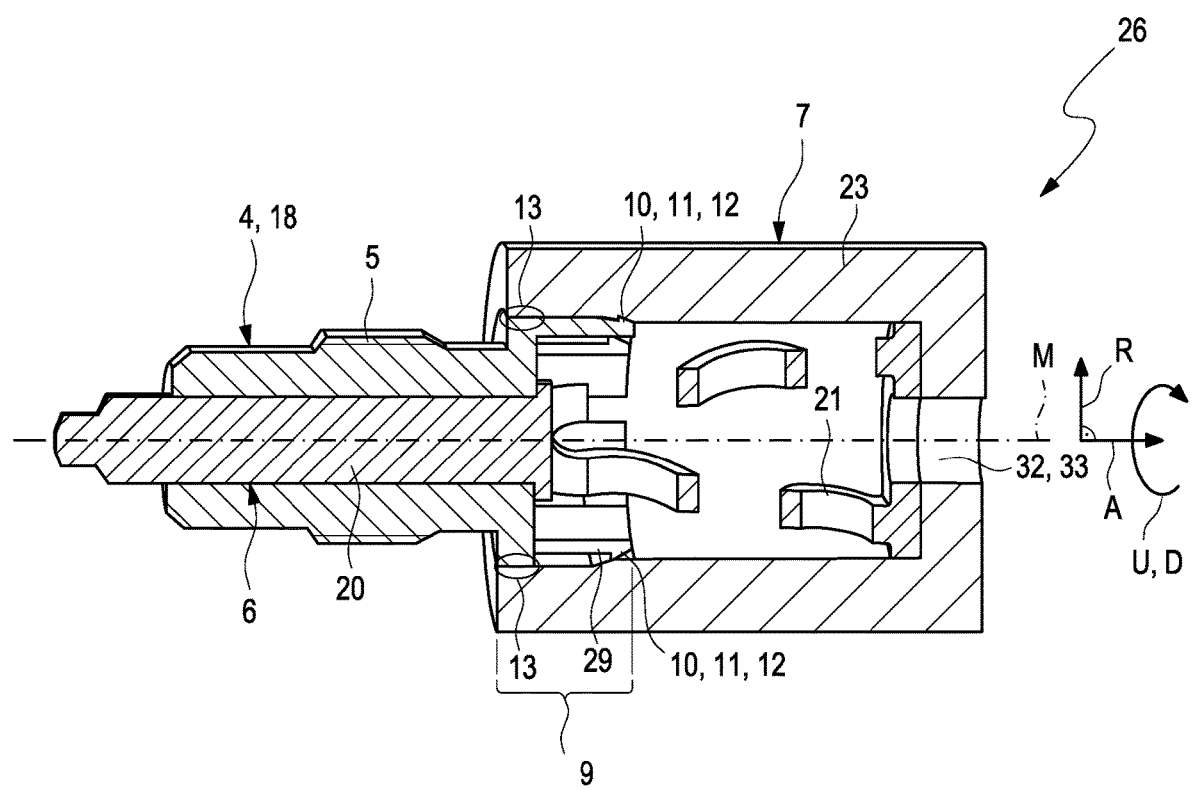
FIG. 3 shows a separate perspective representation of threaded bush and permanent magnet body.

FIG. 1 illustrates in a sectional representation an example of an expansion valve 1 according to the invention. The expansion valve 1 includes a housing 2 delimiting a housing interior. In addition, the expansion valve 1 includes a stator 27 with electrically energisable stator windings 28, which is arranged in a fixed position on the housing 2, and a rotor 26 rotatable relative to the stator 27.

A part of this rotor 26 is formed by a threaded bush 4 of the expansion valve 1 extending along an axial direction A and comprising an external thread 5. The axial direction A extends about a common centre longitudinal axis M of the bush 4. A radial direction R extends perpendicularly to the axial direction A away from the centre longitudinal axis M. A circumferential direction U runs perpendicularly both to the axial direction A and also to the radial direction R round about the centre longitudinal axis M. A rotary direction D of the rotor 26 relative to the stator 27 is identical to the circumferential direction U.

According to FIG. 1, the threaded bush 4 is arranged in the housing interior 3. In the threaded bush 4 a valve body 6 of the expansion valve 1 is adjustably received along the axial direction A. Further, the expansion valve 1 comprises a permanent magnet body of pot-shaped design 7, which is arranged in the housing interior 3 and firmly connected to the threaded bush 4. The permanent magnet body 7 is formed by a magnetic or magnetisable material, for example, ferrite or a rare-earth element, which generates a permanent magnetic field. Like the threaded bush 4, the permanent magnet body 7 is also part of the rotor 26. The permanent magnet body 7 can comprise multiple magnet elements arranged next to one another along the circumferential direction U with alternating north-south magnetisation (not shown). The material of the threaded bush 4 can be a plastic or a metal, for example brass.

The threaded bush 4, the permanent magnet body 7 and the valve body 6 are arranged coaxially to one another according to FIG. 1.

FIG. 2 shows the rotor 26, i.e. the permanent magnet body 7 and the threaded bush 4, in a representation that is separate and enlarged compared with FIG. 1. According to the FIGS. 1 and 2, the permanent magnet body 7 extends the threaded bush 4 along the axial direction A so that the valve body 6 is also partially received in a valve body receptacle 8 surrounded by the permanent magnet body of pot-shaped design 7. Here, the permanent magnet body 7 surrounds the threaded bush 4 in a common transition portion 9 with respect to the radial direction R radially outside. In this transition portion 9, an inner circumference side 24 of the permanent magnet body 7 lies firmly against an outer circumference side 25 of the threaded bush 4. Here, the permanent magnet body 7 is firmly connected to the threaded bush 4 in the transition portion 9 by means of a frictional connection.

In addition to the frictional connection, the permanent magnet body 7 is firmly connected to the threaded bush 4 in the transition portion 9 by means of a latching connection 10 that is substantial for the invention. This scenario is illustrated by the FIGS. 3 and 4, which show the threaded bush 4 and the permanent magnet body 7 in the transition portion 9, wherein FIG. 4 is a detail representation of the FIG. 3 in the region of the latching connection 10. The latching connection 10 includes at least one preferably spring-elastic latching hook 11 formed on the threaded bush 7, which lies against the inner circumference side 24 of the permanent magnet body 7 and exerts a preload force on the same. In the example of the figures, multiple such latching hooks 11 are arranged spaced apart from one another along the circumferential direction U. By means of the latching hooks 11 of the latching connection 10 in the transition portion 9, a positive-locking connection between the threaded bush 4 and the permanent magnet body 7 is formed.

For forming the positive connection of the threaded bush 4 with the permanent magnet body 7, the latching hooks 11 of the latching connection 10 are each partially received in respective indentations 12, i.e. recesses, formed on the permanent magnet body 7 on the inner circumference side. Each indentation 12 or recess can be formed complementarily to the respective latching hook 11 or to the part region of the latching hook 11 that is received in the indentation 12. The latching connection 10 or the latching hooks 11 can, furthermore, be also designed so that these also co-generate the frictional connection between the threaded bush 4 and the permanent magnet body 7. For this purpose, the latching hooks 11 can be formed for example so that a flat contact with the permanent magnet body 7 materialises.

Figure 4:
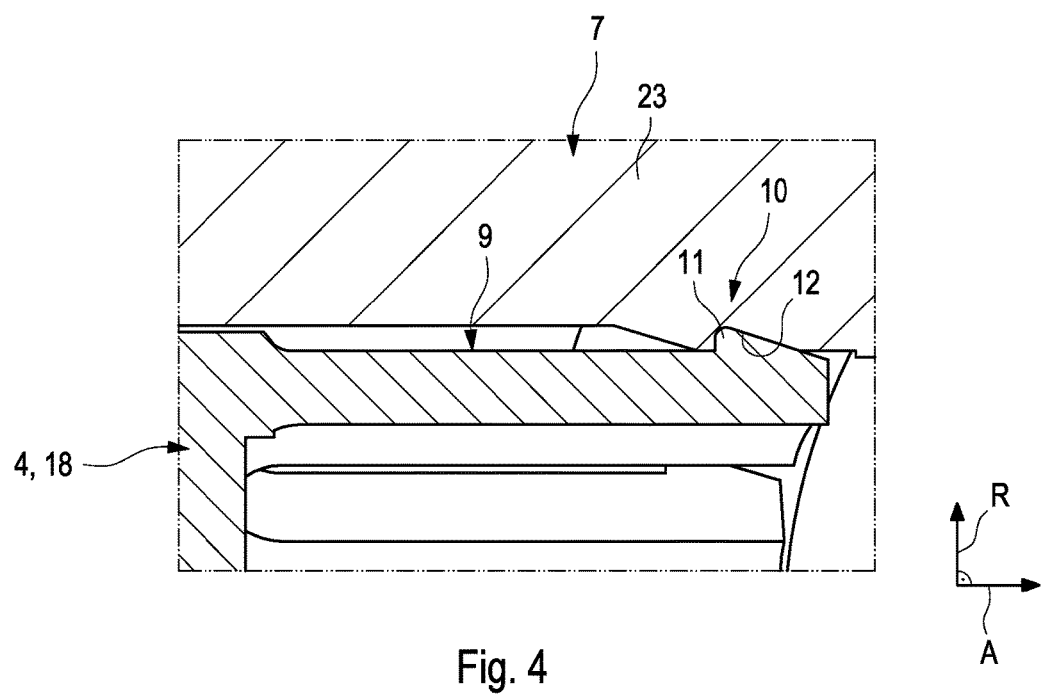
FIG. 4 shows a detail representation of FIG. 4 in the common transition portion of threaded bush and permanent magnet body.
Figure 5:
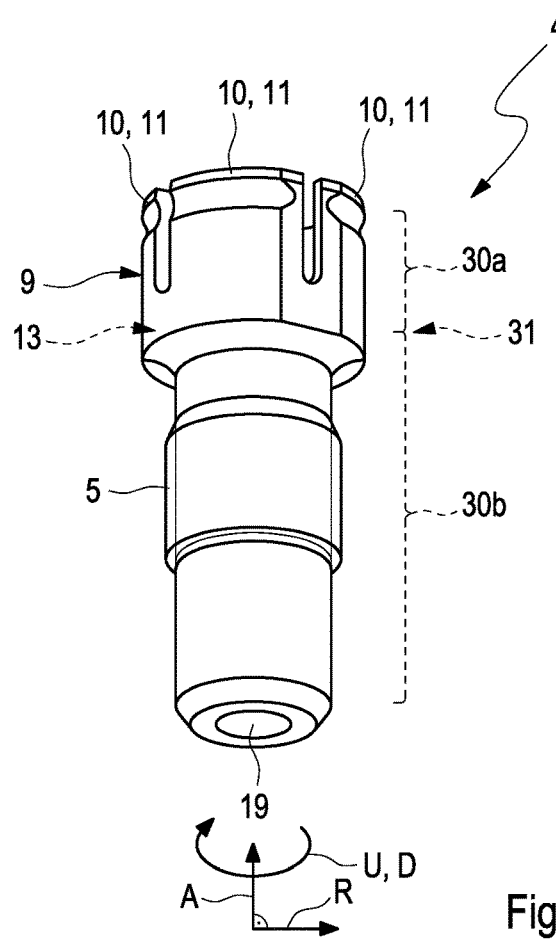
FIG. 5 shows a separate perspective representation of the threaded bush.

As is illustrated in particular by the FIGS. 3 and 5, a knurling 13 can be formed on the threaded bush 4 in the transition portion 9 in order to improve the frictional connection between the threaded bush 4 and the permanent magnet body 7.

The non-rotatable connection between the permanent magnet body 7 and the threaded bush 4 can—alternatively or additionally to the positive connection realised by means of the latching connection 10—take place optionally via a further positive connection. Such a positive locking connection can be realised for example by an oval threaded bush 4 and a negative contour in the permanent magnet body 7 formed complementarily thereto.

In the following, reference is again made to FIG. 1. Accordingly, the expansion valve 1 includes a valve seat 16 firmly connected to the housing 2, which surrounds a valve opening 17, which, by means of the valve body 6 or of the valve needle 20, can be closed in a fluid-type manner in a closed position and, in an open position, can be opened for the fluid to flow through.

Figure 7:
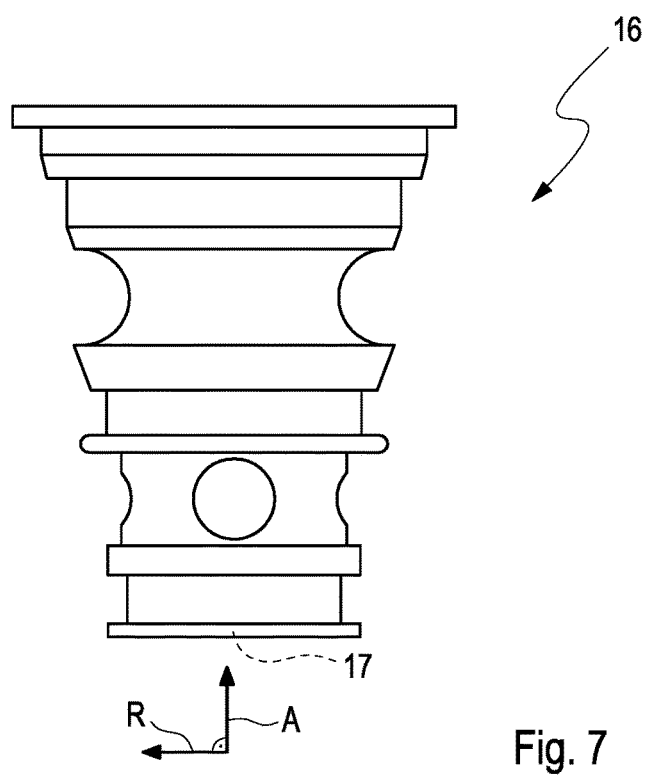
FIG. 7 shows a separate perspective representation of the valve seat.

For illustration, the valve seat 16 is shown in a separate perspective representation in FIG. 7.

According to FIG. 1, an internal thread formed complementarily to the external thread 5 of the threaded bush 4 is present on a bush guide 14 present on the valve seat 16. The internal thread 15 engages in the external thread 5 and interacts with the external thread 5 in such a manner that a rotary movement of the threaded bush 4 along the direction of rotation D, i.e. along the circumferential direction U and perpendicularly to the axial direction A, brings about an adjustment of the valve body 6 along the axial direction A relative to the valve seat 16 or to the bush guide 14—and thus also relative to the housing 2.

The external thread 5 on the threaded bush 4 and the associated internal thread 15 on the permanent magnet body 7 can be viewed generally analogously to a threaded spindle, with which a rotary movement is converted into a translational movement of an engagement element such as a nut engaged with the threaded spindle. Such threaded spindles consist of a threaded rod, i.e. a cylindrical round bar, on which in simple applications an acme, pointed or flat thread or similar is applied. The principle described above corresponds to that of a helical gearing.

In particular according to the FIGS. 1, 2 and 5—the latter shows the threaded bush 4 in a separate perspective representation—the threaded bush 4 can be formed as a hollow shaft 18 with an axially extending through-opening 19, in which the valve body 6 is axially adjustably arranged between a closed position and an open position. The figures show the valve body 6 in a closed position, in which it closes the valve opening 17 in a fluid-tight manner.

The valve opening 17, the through-opening 19, the valve body receptacle 8 and an opening 32 provided in the pot bottom 23 of the permanent magnet body 7 are part of a refrigerant channel 33 through which a refrigerant can flow.

For adjusting the valve body 6 in the axial direction A and thus for opening or closing the expansion valve 1 according to the invention, a turning of the rotor 26 along the rotary direction D relative to the stator 27 takes place. The turning of the rotor 26 is brought about by a corresponding electrical energising of the stator 27 or the stator windings 28 of the same. The magnetic field generated by this interacts with the magnetic field generated by the permanent magnet body 7 or its magnet elements, as a result of which a torque acting on the permanent magnet body 7 that is rotatable along the rotary direction D is created.

By way of the interaction of external thread 5 and internal thread 15 explained above, an axial adjustment of the threaded bush 4 together with the permanent magnet body 7 takes place upon a turning of the rotor 26, as a result of which the valve body 6 can be pressed onto the valve seat 16 or lifted off the same. When the rotor 26 is turned in the rotary direction D, the permanent magnet body 7 and thus also the threaded bush 4 are adjusted downwards along the axial direction A according to FIG. 1. From the pot bottom 23 of the permanent magnet body 7, the support element 22a, the spring-elastic element 21 and the valve needle 20 are axially taken along towards the valve seat 16 and moved into the closed position, in which the valve needle 20 closes the valve opening 17 in a fluid-tight manner. When the rotor 26 is now turned against the direction of ration D, the permanent magnet body 7, and thus also the threaded bush 4, are adjusted upwards along the axial direction according to FIG. 1. In the process, the support element 22a, the spring-elastic element 21 and the valve needle 20 are taken along and moved axially away from the valve seat 16 towards an open position (not shown), in which the valve needle 20 opens the valve opening 17 for the fluid, in particular refrigerant to flow through.

The through-opening 19 noticeable in the FIGS. 5 and 2 can be provided with a radial step 31 which subdivides the through-opening 19 into a first axial longitudinal portion 30a facing the permanent magnet body 7 and a second axial longitudinal portion 30b facing away from the permanent magnet body 7. In this case, the valve needle 20, as shown in FIG. 2, can be received in the second axial longitudinal portion 30b, the spring-elastic element 21 by contrast in the first axial longitudinal portion 30a.

Here, the second support element 22b lies against the radial step 31 of the threaded bush 4. Thus, the spring-elastic element 21 can preload the valve needle 20 into the closed position and accordingly realise the function of a safety or pressure relief valve.

Figure 6:
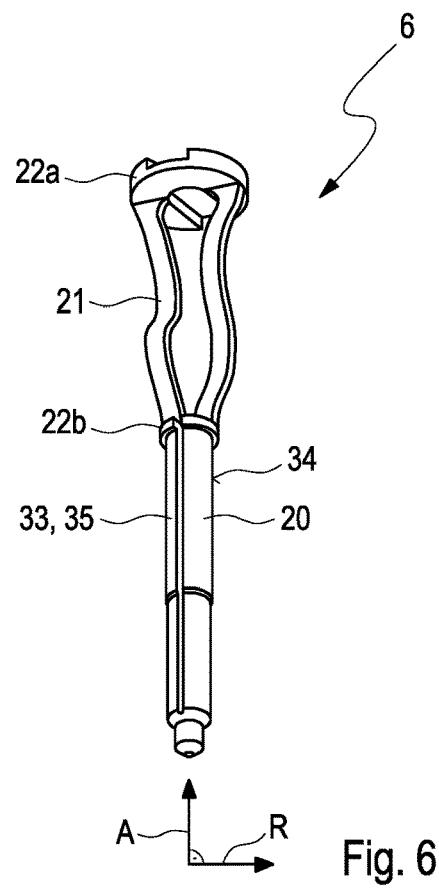
FIG. 6 shows a separate perspective representation of the valve body.

FIG. 6 shows the valve body 6 in a separate representation. In particular by way of the FIGS. 1, 2 and 6 it is noticeable that the valve body 6 comprises a valve needle 20 for the fluid-tight closing of the through-opening 19 and a spring-elastic element 21 for axially preloading the valve needle 20 to the valve seat 16. In particular according to the FIGS. 1, 2 and 6, the valve body 6 axially supports itself by means of a first support element 22a on a pot bottom 23 of the permanent magnet body of pot-shaped design 7 and axially on the threaded bush 4 by means of a second support element 22b. According to the FIGS. 1, 2 and 6, the spring-elastic element 21 is practically arranged axially between the two first support elements 22a, 22b. The spring-elastic element 21, the two support elements 22a, 22b and the valve needle 20 can, as shown, be formed integrally. On the outer circumference 34 of the valve needle 20, a groove-like recess 35 can be formed, which forms a part of the refrigerant channel 33 that can be flowed through by the refrigerant.

The invention claimed is:

1. An expansion valve for an air-conditioning system, a battery cooler, and/or an oil cooler of a motor vehicle, the expansion valve comprising:
   a housing delimiting a housing interior;
   a threaded bush arranged in the housing interior and extending along an axial direction, the threaded bush including an external thread;
   a valve body partially adjustably received in the threaded bush along the axial direction;
   a permanent magnet body of a pot-shaped design;
   the permanent magnet body arranged in the housing interior;
   the permanent magnet body extending the threaded bush along the axial direction such that the valve body is partially received in a valve body receptacle surrounded by the permanent magnet body;
   the permanent magnet body surrounding a radially outside of the threaded bush in a common transition portion; and
   wherein, in the common transition portion, the permanent magnet body is connected to the threaded bush via a latching connection.

2. The expansion valve according to claim 1, wherein the latching connection includes at least one latching hook disposed on the threaded bush, the at least one latching hook lying against the permanent magnet body and exerting a preload force against the permanent magnet body.

3. The expansion valve according to claim 2, wherein the at least one latching hook is at least partially received in an indentation of the permanent magnet body forming a positive connection of the threaded bush with the permanent magnet body.

4. The expansion valve according to claim 3, wherein at least one of:
   the at least one latching hook is arranged on an axial longitudinal side of the threaded bush that axially faces the permanent magnet body; and
   the at least one latching hook extends along the axial direction.

5. The expansion valve according to claim 1, wherein, at least via the latching connection in the common transition portion, a positive-locking connection between the threaded bush and the permanent magnet body is formed.

6. The expansion valve according to claim 1, wherein the permanent magnet body, in the common transition portion, is further connected to the threaded bush via a frictional connection.

7. The expansion valve according to claim 6, wherein the latching connection is configured to provide the frictional connection between the threaded bush and the permanent magnet body.

8. The expansion valve according to claim 1, wherein, in the transition region, a knurling is disposed on the threaded bush.

9. The expansion valve according to claim 1, further comprising (i) a valve seat connected to the housing and (ii) a bush guide, wherein:
the threaded bush is structured as a hollow shaft with an axially extending through-opening in which the valve body is received;
the valve seat surrounds a valve opening in which the threaded bush with the valve body is adjustably received;
the bush guide is disposed on the valve seat and includes an internal thread complementarily to the external thread of the threaded bush; and
the internal thread interacts with the external thread such that a rotary movement of the threaded bush along a rotary direction perpendicularly to the axial direction causes an adjustment of the valve body along the axial direction relative to at least one of the valve seat and the bush guide.

10. The expansion valve according to claim 9, wherein the valve body includes:
a valve needle for fluid-tight closing of the through-opening; and
a spring-elastic element for axially preloading the valve needle.

11. The expansion valve according to claim 10, wherein the valve body includes (i) a first support element via which the valve body is supported on the permanent magnet body and (ii) a second support element via which the valve body is supported on the threaded bush.

12. The expansion valve according to claim 11, wherein the spring-elastic element is arranged axially between the first support element and the second support element.

13. The expansion valve according to claim 1, wherein the permanent magnet body is composed of at least one of a magnetic material and a magnetisable material.

14. The expansion valve according to claim 2, wherein the at least one latching hook is configured as a spring-elastic latching hook.

15. The expansion valve according to claim 11, wherein the valve body is supported on a pot bottom of the permanent magnet body via the first support element.

16. The expansion valve according to claim 11, wherein the first support element, the second support element, the spring-elastic element, and the valve needle are integrally provided as a single piece.

17. An expansion valve for an air-conditioning system, a battery cooler, and/or an oil cooler of a motor vehicle, the expansion valve comprising:
a housing delimiting a housing interior;
a threaded bush arranged in the housing interior and extending along an axial direction, the threaded bush including an external thread;
a valve body partially adjustably received in the threaded bush along the axial direction;
a pot-shaped permanent magnet body arranged in the housing interior, the permanent magnet body defining a valve body receptacle in which the valve body is at least partially received;
the threaded bush arranged at least partially in the valve body receptacle such that the permanent magnet body surrounds a portion of the threaded bush on a radially outside in a transition portion;
the threaded bush protrudes from the permanent magnet body in the axial direction; and
wherein, in the common transition portion, the permanent magnet body is connected to the threaded bush via a latching connection.

18. The expansion valve according to claim 17, wherein the valve body includes:
a first support element via which the valve body is supported on the permanent magnet body; and
a second support element via which the valve body is supported on the threaded bush.

19. The expansion valve according to claim 18, wherein:
the threaded bush includes an axially extending through-opening; and
the valve body further includes:
a valve needle extending through and projecting out of the through-opening in the axial direction; and
a spring-elastic element connecting the first support element and the second support element.

20. An expansion valve for an air-conditioning system, a battery cooler, and/or an oil cooler of a motor vehicle, the expansion valve comprising:
a housing delimiting a housing interior;
a threaded bush arranged in the housing interior and extending along an axial direction, the threaded bush including an external thread;
a valve body partially adjustably received in the threaded bush along the axial direction;
a pot-shaped permanent magnet body arranged in the housing interior, the permanent magnet body defining a valve body receptacle in which the valve body is at least partially received;
the threaded bush arranged at least partially in the valve body receptacle and protruding from the permanent magnet body in the axial direction;
the permanent magnet body including at least one indentation disposed in a circumferential surface of the permanent magnet body that at least partially defines the valve body receptacle; and
the threaded bush including a plurality of spring-elastic latching hooks engaged with the at least one indentation such that the threaded bush is connected to the permanent magnet body via a latching connection.

* * * * *